Jan. 13, 1942. A. S. KNAPP 2,269,853
JUICER DRIVE MECHANISM
Filed Aug. 12, 1940
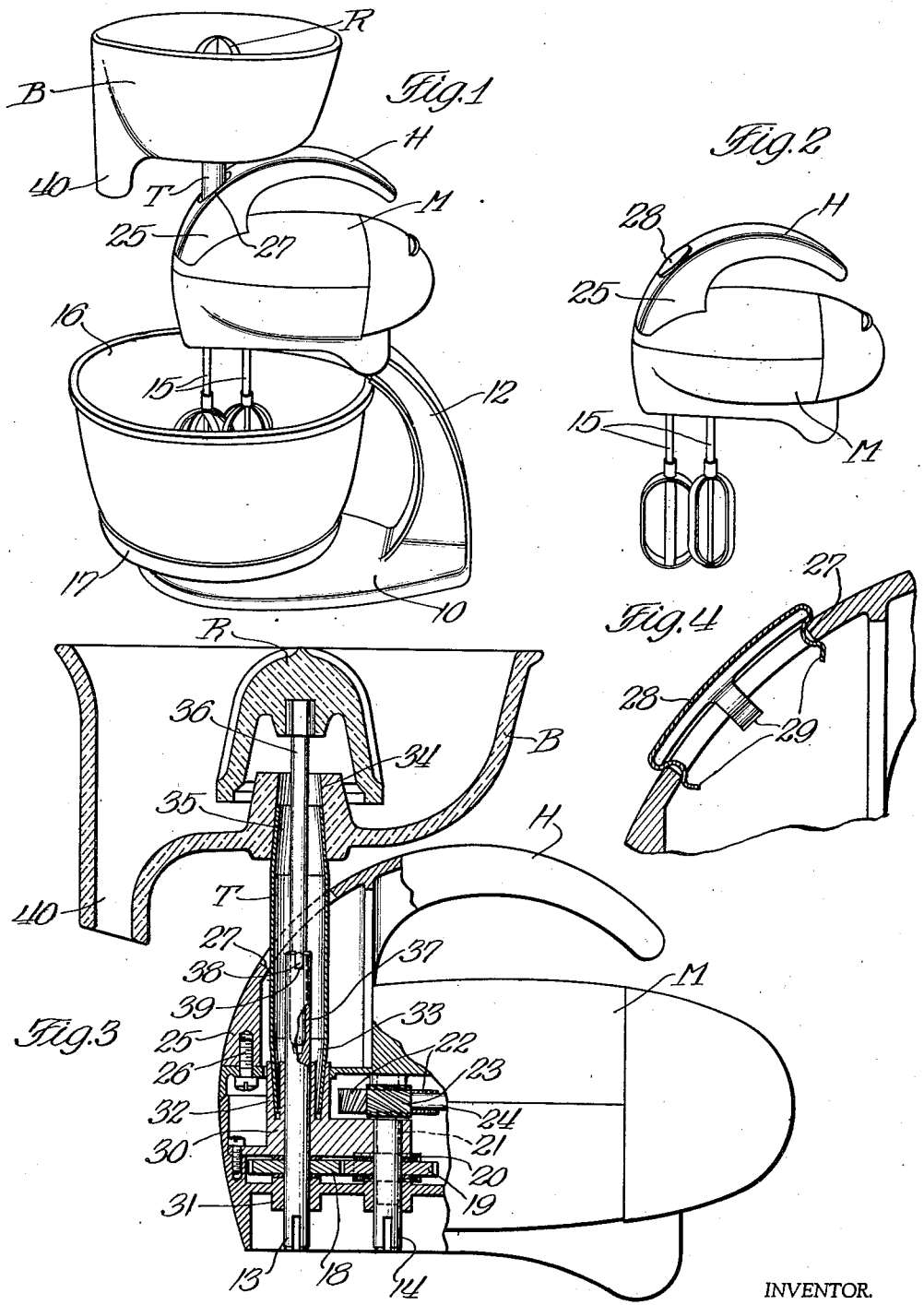
INVENTOR.
Andrew S. Knapp
BY Bair & Freeman
ATTORNEYS Patented Jan. 13, 1942

2,269,853

UNITED STATES PATENT OFFICE 2,269,853

JUICER DRIVE MECHANISM

Andrew S. Knapp, St. Louis, Mo., assignor to Knapp-Monarch Company, St. Louis, Mo., a corporation of Missouri Application August 12, 1940, Serial No. 352,293

5 Claims. (Cl. 146—3)

My present invention relates to a juicer drive mechanism particularly adapted for food mixers.

One object of the invention is to provide a simple and inexpensive supporting means for a juicer mechanism with respect to a food mixer and a simple means for operating a fruit reamer from the mixer motor, the reamer being positioned in the juicer bowl.

Another object is to provide a juicer drive mechanism for a food mixer having a handle for supporting the mixer motor, the juicer drive mechanism and also the supporting means for the juicer mechanism passing through an opening in the base of the handle after a removable cover has been removed from the opening.

Still a further object is to provide means for rigidly supporting the juicer bowl with respect to the mixer motor consisting of a sleeve having tapered ends, the sleeve passing through the opening in the handle and the tapered ends coacting respectively with a tapered socket in a hub surrounding a beater drive shaft and a tapered socket in the base of the juicer bowl, the fruit reamer having a shaft extending through the sleeve and drivingly coacting with the beater shaft therein.

With these and other objects in view, my invention consists in the construction, arrangement and combination of the various parts of my device whereby the objects contemplated are attained, as hereinafter more fully set forth, pointed out in my claims and illustrated in the accompanying drawing, wherein:

Figure 1 is a perspective view of a food mixer with my juicer drive mechanism applied thereto;

Figure 2 is a perspective view of the mixer motor with the juicer mechanism removed and a cover plate positioned over an opening in the handle for the mixer;

Figure 3 is an enlarged view partially in vertical section showing the coaction of the parts of the juicer drive mechanism and the mixer motor, and Figure 4 is a similar sectional view of a portion of the handle with the removable cover mounted in position.

On the accompanying drawing, I have used the reference numeral 10 to indicate a base and 12 a supporting arm for a mixer motor M. The mixer is the usual type used for food and ordinarily provided with a pair of beater shafts 13 and 14 adapted to drive egg beater elements 15 cooperating with a bowl 16 on a revoluble platform 17 on the base 10.

The shafts 13 and 14 are driven with relation to each other by gears 18 and 19 and the shaft 14 is driven by a gear 20 on a countershaft 21. A worm gear 22 is mounted on the countershaft 21 and meshes with a worm 23 of the motor shaft 24.

A handle H is provided for the motor M and is adapted for supporting the motor by hand when the motor is removed from the support 12, as shown for instance in Figure 2. The handle H is of the open-end type having an enlarged base 25 secured to the motor M as by screws 26. The base of the handle H is provided with an opening 27 which is normally closed by a cover plate 28. The cover plate 28 is provided with spring prongs 29 so that it may be snapped into position or readily pried loose as desired. The cover plate 28 may include a trade-mark or other suitable insignia conforming to the design of the mixer.

The beater drive shaft 13 is mounted in bearings 30 and 31. The bearing 30 is provided with a sleevelike hub 32 tapered interiorly. A supporting tube T is provided for a juicer bowl B. The tube T has a tapered lower end 33 adapted to snugly fit in the tapered hub 32.

The juicer bowl B has a tapered bore 34 adapted to receive a similar tapered end 35 of the supporting tube T.

A fruit reamer R is mounted within the juicer bowl B and has an operating shaft 36 extending downwardly therefrom. The shaft 36 is supported and driven relative to the beater shaft 13 by having its lower end extended into a bore 37 thereof and having a cross pin 38 coacting with a slot 39 of the beater shaft 13.

From the foregoing construction, the operation of my juicer drive mechanism is believed obvious. Briefly, the juicer mechanism consisting of the parts T, B and R, when not in use, is removed from the mixer motor M and the opening 27 is closed by the cover plate 28 to prevent entrance of foreign material into the mechanism, and to give a finished appearance to the article. To install the juicer mechanism, it is a simple matter to remove the cover plate 28, insert the tube T into the hub 32, place the bowl B on the tube, and then insert the shaft 36 into the bore 37 of the shaft 13. The reamer may thereupon be operated by energizing the motor, and citrous fruit or the like reamed on the reamer by holding one half of the fruit over the reamer while it is rotating. The juice from the fruit is discharged through a spout 40 on the bowl B.

While I have shown a particular embodiment of my invention, it will be understood of course that I do not wish to be limited thereto since many modifications may be made, and I therefore contemplate by the claims appended hereto to cover any such modifications or substitutions of mechanical equivalents as fall within the true spirit and scope of my invention without sacrificing any of its advantages.

I claim as new and desire to secure by Letters Patent of the United States:

1. In a juicer drive mechanism for food mixers, a mixer motor, a handle therefor, a pair of beater drive shafts geared to the shaft of said motor, a juicer bowl, a fruit reamer, and means for supporting said juicer bowl and fruit reamer on said motor comprising a removable sleeve having tapered ends, said handle having an opening therethrough for said sleeve, said mixer motor having a tapered socket surrounding one of said beater shafts, one of the tapered ends of said sleeve being received therein, said juicer bowl having a tapered socket receiving the other tapered end of said sleeve, and said fruit reamer having a shaft extending through said sleeve and cooperating with said one of said beater shafts to be driven thereby.

2. In a juicer drive mechanism for fruit mixers, a mixer motor, a handle therefor, a beater drive shaft geared to the shaft of said motor, a juicer bowl, a fruit reamer, and means for supporting said juicer bowl and fruit reamer on said motor comprising a sleeve having tapered ends, said handle having an opening therethrough to receive said sleeve, said mixer motor having a tapered socket receiving one of the tapered ends of said sleeve, said juicer bowl having a tapered socket receiving the other end of said sleeve, and said fruit reamer having a shaft through said sleeve and drivingly cooperating with said beater shaft.

3. A juicer drive mechanism of the class described in combination with a food mixer motor having a handle, the medial line of which is located in a plane containing the shaft of the motor, and a pair of beater drive shafts geared to the shaft of said motor with one of said beater drive shafts passing through said axis, said axis, said juicer drive mechanism comprising a juicer bowl, a fruit reamer, and means for supporting said juicer bowl and fruit reamer on said motor including a sleeve independent of both the motor and the bowl, said handle having an opening therethrough for said sleeve, said mixer motor having a socket surrounding one of said beater shafts, one of the ends of said sleeve being received therein, said juicer bowl having a socket receiving the other end of said sleeve, and said fruit reamer having a shaft extending through said sleeve and cooperatively connected with said one of said beater shafts.

4. In combination, a mixer motor, a handle for supporting said motor, a shaft geared to said motor, a hub for said shaft having a tapered bore, the base of said handle being positioned over said hub and having an opening aligned therewith, a juicer bowl, a fruit reamer, a sleeve having tapered ends to coact respectively with said tapered bore of said hub and with said juicer bowl when extending through said opening in said base of said handle, said fruit reamer having a shaft operatively coacting with said first shaft said fruit reamer shaft extending through said sleeve from said first shaft to said reamer.

5. In combination, a mixer motor, a handle for supporting said motor, a beater shaft geared to said motor, said handle and beater shaft being in a vertical plane containing the axis of the shaft of the motor, a hub for said shaft and having a tapered bore surrounding the shaft, the base of said handle being positioned over said hub and having an opening aligned therewith, a juicer bowl, a fruit reamer, a sleeve having tapered ends to coact respectively with said hub and said juicer bowl with the intermediate portion thereof extending through said opening in said base of said handle, said fruit reamer having a shaft extending through said sleeve and operatively coacting with said beater shaft.

ANDREW S. KNAPP.